(12) United States Patent
DiMeo et al.

(10) Patent No.: US 8,718,632 B2
(45) Date of Patent: May 6, 2014

(54) SERVICE DELIVERY NETWORK

(75) Inventors: David M. DiMeo, Northville, MI (US); Julius Marchwicki, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 12/869,088

(22) Filed: Aug. 26, 2010

(65) Prior Publication Data

US 2012/0052854 A1    Mar. 1, 2012

(51) Int. Cl.
*H04M 3/00* (2006.01)
*H04W 4/02* (2009.01)
*H04W 4/04* (2009.01)

(52) U.S. Cl.
CPC ............... *H04W 4/027* (2013.01); *H04W 4/04* (2013.01); *H04W 4/021* (2013.01); *H04W 4/026* (2013.01)
USPC ...... 455/419; 455/433; 455/412.1; 455/456.1

(58) Field of Classification Search
CPC .................................................. H04W 4/027
USPC ............................................ 455/412.1, 433
See application file for complete search history.

(56) References Cited

U.S. PATENT DOCUMENTS

| | | |
|---|---|---|
| 5,664,177 A | 9/1997 | Lowry |
| 5,717,742 A | 2/1998 | Hyde-Thomson |
| 6,092,101 A | 7/2000 | Birrell et al. |
| 6,157,616 A | 12/2000 | Whitehead |
| 6,161,071 A | 12/2000 | Shuman et al. |
| 6,212,265 B1 | 4/2001 | Duphorne |
| 6,330,436 B1 | 12/2001 | Zidel |
| 6,427,115 B1 | 7/2002 | Sekiyama |
| 6,442,592 B1 | 8/2002 | Alumbaugh et al. |
| 6,622,124 B1 | 9/2003 | Kolls |
| 6,625,257 B1 | 9/2003 | Asaoka et al. |
| 6,658,485 B1 | 12/2003 | Baber et al. |
| 6,728,531 B1 | 4/2004 | Lee et al. |
| 6,799,201 B1 | 9/2004 | Lee et al. |
| 6,856,820 B1 | 2/2005 | Kolls |
| 6,925,466 B2 | 8/2005 | Jensen et al. |
| 7,003,289 B1 | 2/2006 | Kolls |

(Continued)

FOREIGN PATENT DOCUMENTS

| | | |
|---|---|---|
| EP | 1791058 A1 | 5/2007 |
| JP | 2005038101 A | 2/2005 |
| WO | WO2004114055 A2 | 12/2004 |

OTHER PUBLICATIONS

Ford Motor Company, "SYNC with Navigation System," Owner's Guide Supplement, SYNC System Version 1 (Jul. 2007).

(Continued)

*Primary Examiner* — David Q Nguyen
(74) *Attorney, Agent, or Firm* — Jennifer M. Stec; Brooks Kushman P.C.

(57) ABSTRACT

A service delivery network provides a variety of services to a caller placing a call to the network through a vehicle communication system. The network includes automatic call routing, and has access to one or more databases with various caller services. These databases include, but are not limited to, traffic, POI databases and routing engines. A system administration manager associated with the network is capable of identifying calls based on a vehicle identification number (VIN) associated with a call, and can store logs of each call, including the identifying VIN.

7 Claims, 4 Drawing Sheets

(56) References Cited

U.S. PATENT DOCUMENTS

| | | | |
|---|---|---|---|
| 7,027,773 B1 | 4/2006 | McMillin | |
| 7,035,634 B2 | 4/2006 | Mead et al. | |
| 7,069,333 B1 | 6/2006 | Morris et al. | |
| 7,130,620 B2 | 10/2006 | Forman et al. | |
| 7,177,634 B2* | 2/2007 | Wang et al. | 455/420 |
| 7,213,150 B1 | 5/2007 | Jain et al | |
| 7,240,089 B2 | 7/2007 | Boudreau | |
| 7,260,631 B1 | 8/2007 | Johnson et al. | |
| 7,280,900 B2* | 10/2007 | Gault et al. | 701/29.6 |
| 7,296,207 B2 | 11/2007 | Fisher et al. | |
| 7,339,913 B2 | 3/2008 | Chou et al. | |
| 7,366,772 B2 | 4/2008 | Arroyo et al. | |
| 7,593,792 B2 | 9/2009 | Berg et al. | |
| 7,624,147 B2 | 11/2009 | Tosey et al. | |
| 7,689,253 B2 | 3/2010 | Basir | |
| 7,801,512 B1* | 9/2010 | Myr | 455/414.1 |
| 7,944,901 B2 | 5/2011 | Souissi et al. | |
| 2001/0023446 A1 | 9/2001 | Balogh | |
| 2002/0106991 A1 | 8/2002 | Foore et al. | |
| 2002/0110146 A1 | 8/2002 | Thayer et al. | |
| 2002/0128882 A1 | 9/2002 | Nakagawa et al. | |
| 2002/0199061 A1 | 12/2002 | Friedman et al. | |
| 2003/0014490 A1 | 1/2003 | Bates et al. | |
| 2003/0017826 A1 | 1/2003 | Fishman et al. | |
| 2003/0023688 A1 | 1/2003 | Denenberg et al. | |
| 2003/0061288 A1 | 3/2003 | Brown et al. | |
| 2004/0092253 A1* | 5/2004 | Simonds et al. | 455/414.2 |
| 2004/0179512 A1 | 9/2004 | Leblanc et al. | |
| 2004/0190693 A1* | 9/2004 | Beiermeister | 379/88.18 |
| 2004/0198366 A1 | 10/2004 | Crocker et al. | |
| 2004/0203634 A1* | 10/2004 | Wang et al. | 455/414.1 |
| 2004/0203645 A1 | 10/2004 | Forman et al. | |
| 2004/0218605 A1 | 11/2004 | Gustafsson et al. | |
| 2005/0017604 A1 | 1/2005 | Yamada | |
| 2005/0033863 A1 | 2/2005 | Tosey | |
| 2005/0038581 A1 | 2/2005 | Kapolka et al. | |
| 2005/0038863 A1 | 2/2005 | Onyon et al. | |
| 2005/0076086 A1 | 4/2005 | Budd et al. | |
| 2005/0195783 A1 | 9/2005 | Basir | |
| 2006/0015221 A1 | 1/2006 | Sarkar et al. | |
| 2006/0023674 A1 | 2/2006 | Goring et al. | |
| 2006/0116127 A1 | 6/2006 | Wilhoite et al. | |
| 2007/0005368 A1 | 1/2007 | Chutorash et al. | |
| 2007/0042812 A1 | 2/2007 | Basir | |
| 2007/0086482 A1 | 4/2007 | Pruzan et al. | |
| 2007/0127363 A1 | 6/2007 | Chaudry et al. | |
| 2007/0237144 A1 | 10/2007 | Adhikari et al. | |
| 2007/0244614 A1 | 10/2007 | Nathanson | |
| 2007/0260751 A1 | 11/2007 | Meesseman | |
| 2007/0291911 A1 | 12/2007 | Visser | |
| 2008/0015748 A1 | 1/2008 | Nagy | |
| 2008/0027643 A1 | 1/2008 | Basir et al. | |
| 2008/0045274 A1 | 2/2008 | Witkowski et al. | |
| 2008/0102854 A1* | 5/2008 | Yi et al. | 455/456.1 |
| 2008/0140408 A1 | 6/2008 | Basir | |
| 2008/0215687 A1 | 9/2008 | Madnani | |
| 2008/0256203 A1 | 10/2008 | Gorty et al. | |
| 2008/0263168 A1 | 10/2008 | Ishii | |
| 2008/0303667 A1 | 12/2008 | Rehman | |
| 2008/0305742 A1 | 12/2008 | Basir | |
| 2008/0313050 A1 | 12/2008 | Basir | |
| 2009/0023425 A1* | 1/2009 | Hosain et al. | 455/412.1 |
| 2009/0024707 A1 | 1/2009 | Aase et al. | |
| 2009/0093242 A1 | 4/2009 | Bhalekar et al. | |
| 2009/0164110 A1 | 6/2009 | Basir | |
| 2009/0240763 A1 | 9/2009 | Hones et al. | |
| 2009/0267774 A1 | 10/2009 | Enegren et al. | |
| 2010/0023204 A1 | 1/2010 | Basir et al. | |
| 2010/0077410 A1 | 3/2010 | Graser et al. | |
| 2010/0137037 A1 | 6/2010 | Basir | |
| 2010/0169432 A1 | 7/2010 | Santori, Jr. et al. | |
| 2010/0190439 A1 | 7/2010 | Huang et al. | |
| 2010/0190493 A1* | 7/2010 | Zoeckler et al. | 455/433 |
| 2010/0227593 A1* | 9/2010 | Myr | 455/414.1 |
| 2011/0225228 A1 | 9/2011 | Westra et al. | |

OTHER PUBLICATIONS

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

Balito, "AccessAble: A Text-to-Speech Mail Client Application", 2008, UPLB ICS.

Marx, M. "Toward Effective Conversational Messaging".1995, MIT.

Muthusamy, Y.; Agarwal, R.; Yifan Gong; Viswanathan, V.; , "Speech-enabled information retrieval in the automobile environment," Acoustics, Speech, and Signal Processing, 1999. ICASSP '99. Proceedings., 1999 IEEE International Conference on, vol. 4, No. pp. 2259-2262 vol. 4, Mar 15-19, 1999.

RFC 791—Internet Protocol, Darpa Internet Program, Protocol Specification, Sep. 1981, prepared for Defense Advanced Research Projects Agency, 1400 Wilson Boulevard, Arlington, VA 22209, by Information Sciences Institute, pp. 1-98.

RFC 1662—PPP in HDLC—like Framing, Network Working Group, STD: 51, Obsoletes: 1549, Category: Standards Track, W. Simpson, Editor, Daydreamer, Jul. 1994, pp. 1-29.

RFC 3344, IP Mobility Support for IPv4, Network Working Group, C. Perkins, Ed., Nokia Research Center, Aug. 2002, Obsoletes: 3220, Category: Standards Track, pp. 1-98.

B. Curtis, et al., An e-mail user interface to Web services, printed from www.ibm.com/developerworks/wireless/library/wi-email/, printed Jan. 28, 2009.

SAM—Simple Asynchronous Messaging, printed from project-sam.awardspace.com/overview.htm, on Sep. 11, 2009.

Focus on the road ahead, IBM Telematics Solutions, Copyright, IBM Corporation 2002.

Queuing Data with Microsoft Message Queue Server, printed from windowsitpro.com/article/articleid/3860, printed Aug. 4, 2009.

Mobile Platform and System Support (Powerpoint Presentation), accessible from www.google.com.

* cited by examiner

SERVICE DELIVERY NETWORK

BACKGROUND

1. Technical Field

The illustrative embodiments generally relate to a service delivery network. More specifically, the illustrative embodiments relate to a network for delivering a variety of services and providing a variety of features for a vehicle communication system connected to the network through a nomadic device or other device having wireless connection capability.

2. Background Art

Use of cellular phones while driving, especially use for texting, has been proven to be more fatal than drunk driving, according to a recent study by Britain's Transport Research Laboratory. In addition, with the onset of GPS systems, car drivers have another potentially hazardous activity in which they can engage, interacting with a personal navigation device while driving. In addition to the potential hazards provided by texting and GPS interaction, drivers may also have access to mobile internet on a PDA or similar device, and may check their email or look up sports scores while driving.

While none of these activities (PDA interaction, GPS interaction, texting, looking up news, weather, sports, etc) are inherently dangerous, all are made significantly dangerous if done by a driver.

Even if a passenger is present, the driver may still engage in any or all of the above activities, and in doing so present a danger to all passengers in the car, and the other drivers. While some of the existing systems providing the above capabilities are voice controllable, the driver must often enable the voice activation. Further, if several voice controllable devices are active at once, commands directed to a first device may be unintentionally received and processed by a second device. This can lead to confusion and more distraction.

Additionally, since the driver may try to avoid the above confusion by powering up and down devices, and switching devices in and out of voice-command modes, distraction can even be present when all present devices are voice controllable.

SUMMARY

In one illustrative embodiment, a service delivery network includes at least one automated call distributor (ACD) to route incoming calls. This ACD can route calls to at least one agent terminal, at least one IVR system, and/or at least one modem for extraction of data embedded in a voice signal.

The network may also include at least one call control gateway (CCG) to manage ACD resources, and at least one system administration manager (SAM) to provide network security. The SAM may also determine a vehicle identification number (VIN) associated with an incoming call, and provide services to that caller based at least in part on the determined VIN. The SAM may further store call records of incoming calls including a VIN associated with each call.

In a second illustrative embodiment, a service delivery system includes a service delivery network, and a vehicle communication system.

The service delivery network includes at least one automated call distributor (ACD) to route incoming calls, at least one call control gateway (CCG) to manage ACD resources, and at least one system administration manager (SAM) to provide network security.

The vehicle communication system includes a computer processor in communication with persistent and non-persistent memory. The communication system also includes a transceiver capable of communicating with a wireless device and in communication with the processor.

In this illustrative embodiment, the processor may automatically connect to the service delivery network through the wireless device. Further, the SAM may automatically verify an incoming call from the processor based on information associated with the incoming call.

In another illustrative embodiment, a computer-enacted method (performed, for example, by a server), includes receiving a first identification associated with a wireless device used to connect a vehicle computing system to a remote network.

The method also includes receiving a second identification associated with a vehicle housing a vehicle computing system and determining a level-of-service associated with at least one of the first or second identification.

Finally, the method includes providing access to services corresponding to the determined level-of-service.

In yet a further illustrative embodiment, a vehicle computing system-enacted method of accessing services includes providing, to a remote network, a first identification associated with a wireless device, operable to wirelessly communicate with a vehicle computing system and the remote network.

The method also includes providing, to the remote network, a second identification associated with a vehicle housing the vehicle computing system.

The method further includes accessing one or more services, the services having been rendered accessible based at least in part on both the first and second identification.

BRIEF DESCRIPTION OF THE DRAWINGS

Other aspects and characteristics of the illustrative embodiments will become apparent from the following detailed description of exemplary embodiments, when read in view of the accompanying drawings, in which.

DETAILED DESCRIPTION

The present invention is described herein in the context of particular exemplary illustrative embodiments. However, it will be recognized by those of ordinary skill that modification, extensions and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

Figure 1:
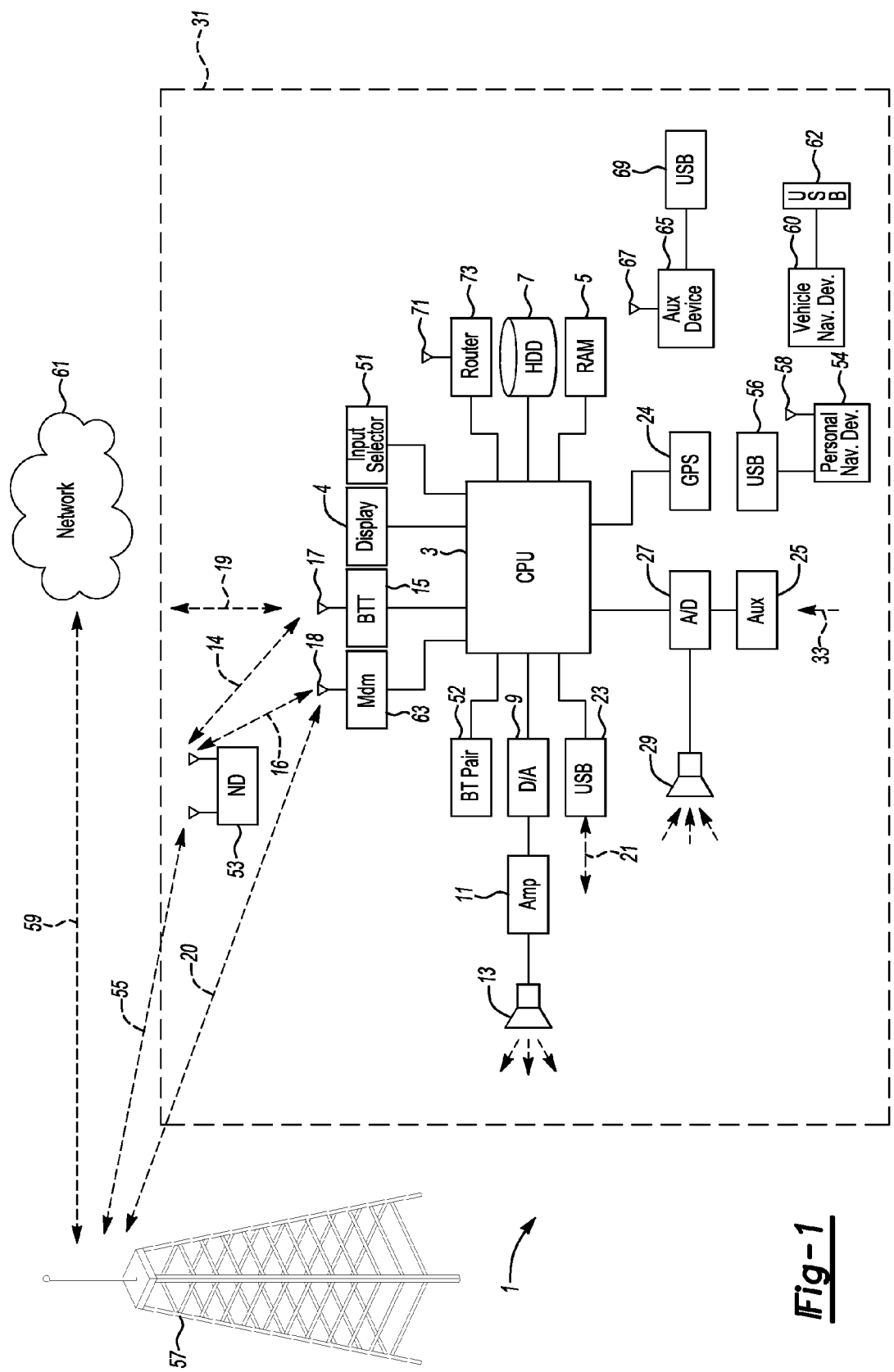
FIG. 1 shows an illustrative example of a vehicle communication and entertainment system capable of network connection.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

Figure 2:
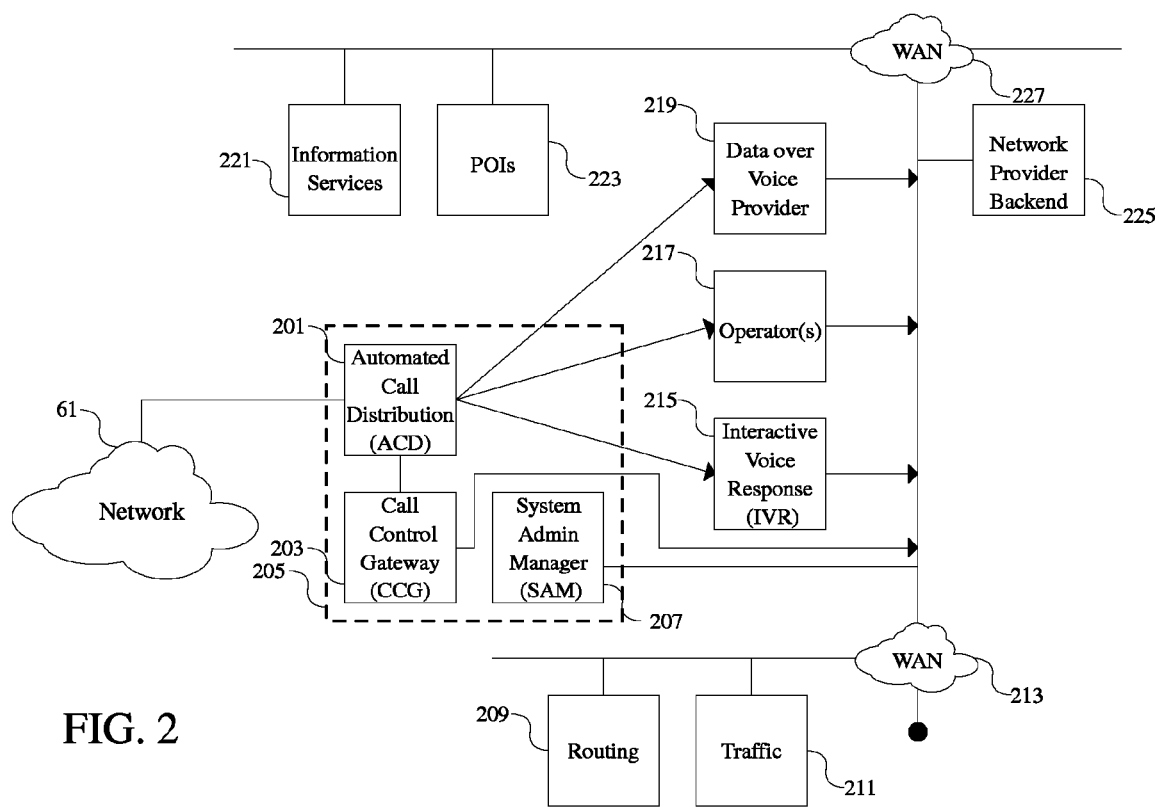
FIG. 2 shows an illustrative example of a service delivery network.

FIG. 2 shows an illustrative example of a service delivery network (SDN) 200. A vehicle communication system connects to the service delivery network through, for example, a cellular network 61. The vehicle communication system can also connect through a variety of other networks, such as through a local network if it is connected to a router.

In one or more illustrative embodiments, when a connection comes in to the SDN it is handled by an Automated Call Distributor (ACD) 201. In this illustrative embodiment, the ACD is a device that may route or distribute incoming calls to, for example, a specific group of terminals that agents use, interactive voice response (IVR) systems that communicate with callers, modem pools to extract electronic data, etc. An exemplary illustrative non-limiting ACD can consist of hardware for terminals and switches, phone lines, software for a routing strategy, etc.

A routing strategy may be a rule based set of instructions that instructs the ACD on how calls are to be handled inside the SDN. This routing can help determined the best available resources for an incoming call or connection. Additional information attached to the incoming connection can be used in an attempt to try and determine why a particular call or connection is being made. This information can include, but is not limited to, caller ID or ANI. If the system can "guess" why a call is being made, routing of the call is facilitated.

The ACD can perform a variety of different functions. For example, the ACD can aid in voice and data transfer between switches, monitor queue and agent activity to effectively allocate calls with appropriate resources, and execute telephony functions.

The ACD can also exchange data on a real-time basis between callers and applications. Since the ACD may be provided with the ability to "guess" why a call is being made, it can serve as an intelligent answering mechanism. The ACD can also archive calls and call logs if this is desired for any reason. For example, the ACD can maintain a single call record for each call, including information such as, but not limited to, how long the call/connection was waiting in an ACD queue, how long the call/connection was on hold, how many times the call/connection was transferred, and caller-specific information from an agent's or IVR wrap-up data when the call is complete or when a service is done being used. A unique identification can be assigned to each call as well.

Another "intelligence" aspect of the ACD can be found in an ability to provide intelligent load balancing, based on, for example, day of the week, time of the day, or other predefined characteristics. Also, by drawing on customer information previously saved in a database, intelligent routing can be performed. For example, if a particular caller calls around 5 pm every day to get a stock update, the system can, based on past performance, reasonably guess that a call incoming at 5:03 pm from that user is for the purpose of checking stocks, and allocate the proper resources accordingly. If the call is for another purpose, resources can be swapped around as needed.

In addition to an ACD, a call control gateway (CCG) can be provided to manage the resources of the ACD and aid in resource allocation to incoming calls/connections. Of course, other resources assigned to the network can also be managed by a CCG.

For example, in one illustrative embodiment, the CCG creates a unique session identification number and utilizes that number to be able to transfer a call between various resources, depending on, for example, the caller's needs within the SDN.

In one illustrative embodiment, calls that need to be moved between the various elements of the SDN will be assigned, monitored, and serviced through a CCG.

Among other things, an exemplary CCG can create rules and tables to be used for routing, transferring and managing calls in the ACD. The ACD can access these rules and tables to determine how an incoming call should be handled. The CCG can interact with telephony and web based services at the same time, providing an interface between the two.

Additionally, a CCG can be made in a scalable fashion, so that if the needs of the network grow, the CCG can be scaled up (or down) as needed. Finally, the CCG can monitor the overall health and welfare of the SDN.

A system administration manager (SAM) 207 may also be provided to the SDN. Among other things, the SAM may be responsible for the security and certification of users, callers, applications and the services on the SDN. The SAM may have direct access to a customer database and may be responsible for allowing or denying services to callers based on, for example, criteria assignable to each caller's account.

The SAM may also be used to pull reports, records, usage patterns (both locally and remote), etc. The SAM may also be able to store and update individual user records. These records can be used in a variety of fashions, including ACD intelligent call routing and charging for chargeable services.

The records, and corresponding reports, can be stored and pulled based on a variety of criteria. A non-exhaustive list includes: individual users, individual services, individual applications, time of day, day of week, phone numbers and vehicle identification numbers (VINs) associated with vehicle based communication system calls.

The SAM is capable of monitoring and providing security for the SDN, by, for example, providing user login IDs and passwords. Also, since the SAM can store and pull reports, the SAM is in a good position to determine if any inappropriate access patterns are occurring. The SAM can also provide certification for applications, including third party applications.

One of the applications to which a call may be routed is the IVR system 215. The IVR system is an automated telephone information system that speaks to a caller using a combination of fixed voice menus and data extracted from a database in real time. For example, the system could welcome the caller with the fixed word "hello" followed by the caller's name "Susan" that it dynamically pulled from a database.

The caller can respond to questions and menus presented by the IVR by speaking or pressing keyed buttons. Additionally, a spoken command by the caller may be translated by the vehicle communication system and sent in the form of a DTMF tone for a particular key. The caller may also be able to speak short phrases which will be understood by the IVR.

The IVR is useful for a variety of applications, including, but not limited to, banking-by-phone, flight-scheduling, ordering services and products, etc. Since the user can handle all necessary commands and inputs via the vehicle communication system, the driving experience is made safer than if the user were hand inputting all the information into, for example, a PDA with internet capability.

Voice portals, systems fronted by speech recognition software, may be designed and integrated into an IVR to help a user obtain desired information.

The IVR may have at its command the ability to phonetically recognize, speaker independent, a very large vocabulary. It may also be able to recognize natural language (such as spoken sentences) and numbers. Continuous alpha numeric recognition may also be provided, so that a user can speak a string of alpha-numeric characters. The IVR may also be interruptible, so that a user can interject a command or phrase if the user already knows which option is desired. It may also be desirable to provide the IVR with the capability of functioning in several languages.

Another service to which the calls may be routed is a data over voice (DOV) provider 219. The DOV providers provides a mechanism to send and receive data across a voice channel. This will be described in detail with respect to FIG. 3.

In addition to the listed network components, the SDN may be connected to a Network Provider Backend 225. This backend can provide essential system services, and may also be used by the network provider to directly access the system.

Also connected to the SDN in this illustrative embodiment are Information Services 221 to provide requested information to callers, a POI database 223 to provide points of interest to drivers, a routing engine 209 to assist with navigation directions, a Traffic database 211 to provide real-time traffic information and Operators 217 to assist callers. The SDN may connect to some or all of these additional services through WANs 213, 227, as some of these services may be provided by alternative providers. Through the WAN connection, however, they all help to comprise the SDN in this illustrative embodiment.

Figure 3:
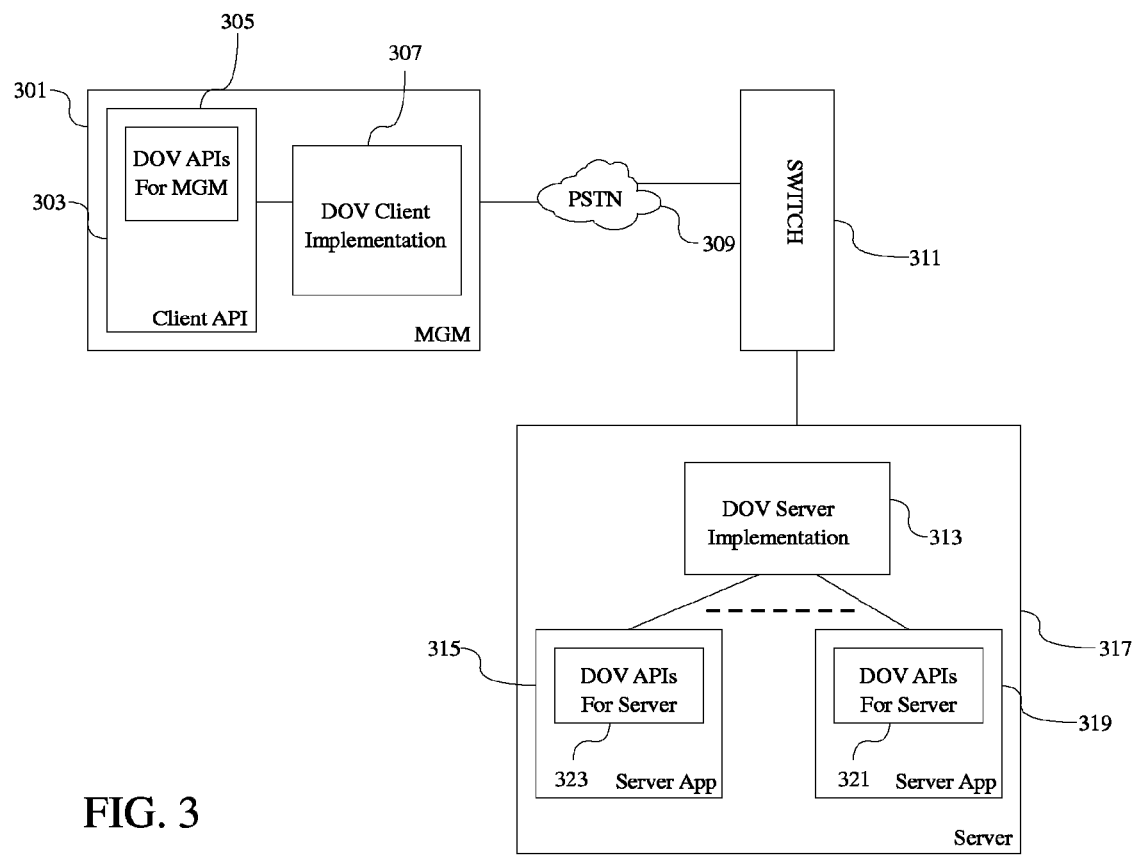
FIG. 3 shows an illustrative example of a data-over-voice (DOV) connection to a network resource providing DOV functionality.

FIG. 3 shows an illustrative example of a data-over-voice (DOV) connection to a network resource providing DOV functionality. On the vehicle communication system side of a connection, a media gateway module (MGM) 301 is provided to initialize the DOV connection. Interfacing with one or more client APIs 303 providing DOV specific APIs 305, the MGM is able to connect to a nomadic device, such as a cell phone, for DOV transfer. The DOV client implementation 307 handles the connection to the nomadic device, and the connection to the network. In one illustrative embodiment, the network 309 is a public switched telephone network (PSTN), although any suitable network may provide the interconnection between the client and server.

A switch 311 is used on the back end, as part of the SDN, to route an incoming DOV call to a server 317 running a DOV server implementation 313. The DOV server implementation 313 has access to one or more DOV APIs 321, 323 provided as server applications 315, 319.

The DOV APIs on both ends allow data to smoothly pass over voice signal carrier lines, and allow both clients and servers to send information as DOV. The DOV call can be initialized on either end, either as a call from the server to the client, or a call from the client to the server.

In one illustrative embodiment, the DOV server auto-restarts in the event of failure, without human intervention. This allows near-continuous service. The DOV server may also log all SNMP connection attempts, and the IP address of an SNMP manager.

Given the variety of services available to users of the SDN, it may be desirable to tier different services as, for example, automatic, free, upgraded, etc. Of course, any classifications and numbers of tierings may be used.

Similarly, particular services may be useable in a vehicle, online, from a nomadic device, etc. Again, all plausible methods of service usage are contemplated.

Additionally, since it is possible that a user is in a vehicle that the user does not own, certain services may be disabled unless the user's phone is a primary phone for the vehicle in which the user is traveling, or is otherwise identified with ownership of the vehicle.

Finally, it may be possible that a user owns more than one vehicle, and so a record could be kept of the vehicles in the user's personal "fleet," so that owner-available options are accessible in all the vehicles.

Since there are such a variety of possible service offerings and locations to which a service may be offered, it may require more than a simple CIN (cellular identification number) to determine if a user is presently authorized to use a service.

In an exemplary scenario, there are four tiers of services. In this illustrative, non-limiting example, there are automatic services, which are provided with the vehicle and are initially included and activated. These services include maintenance and recall warnings, for example, and emergency services.

A second tier of services, free services, are services that the user can download and/or enable using, for example, a nomadic device or a website. These services include, but are not limited to, music players, email readers, etc.

A third tier of services, upgraded services, are services that may be standard on some higher line vehicles, or may be offered as promotions that eventually mature into cost-if-used services. These could include premium OEM and third party applications.

A fourth classification of services could be vehicle and/or fleet specific services. This classification may be paired with another classification to determine a service that is only usable in a particular vehicle or group of vehicles that the user owns.

If the SDN only uses a CIN number to identify a user, then the SDN doesn't know anything about the user except for the information tied to that CIN. This may be sufficient to provide access to certain services, or it may not. For example, information corresponding to the VINs of the vehicle(s) owned by the user may be stored, so a CIN might be enough to provide basic access privileges.

If any privileges are restricted to a particular vehicle, however, then the SDN has no idea if the user is in that vehicle, or in a vehicle at all.

Similarly, if the nomadic device were to simply transmit a VIN corresponding to a vehicle in which the user was currently traveling, the SDN might not be able to determine whether or not a particular user was authorized to use a particular service.

In this illustrative example, there are also four types of services for use in particular environments (again, these examples are provided for illustrative, not limiting, purposes). These services include user specific services, vehicle specific services, user-in-vehicle specific services, and user-in-fleet specific services.

Based on identification made using a combination of VIN and CIN, cross-referenced with information stored on the SDN, the SDN is able to determine whether or not a particular user is able to use a particular service when that service is requested. Similarly, if a list of services is requested, the SDN can determine, based on these identifiers, which services to list.

Figure 4:
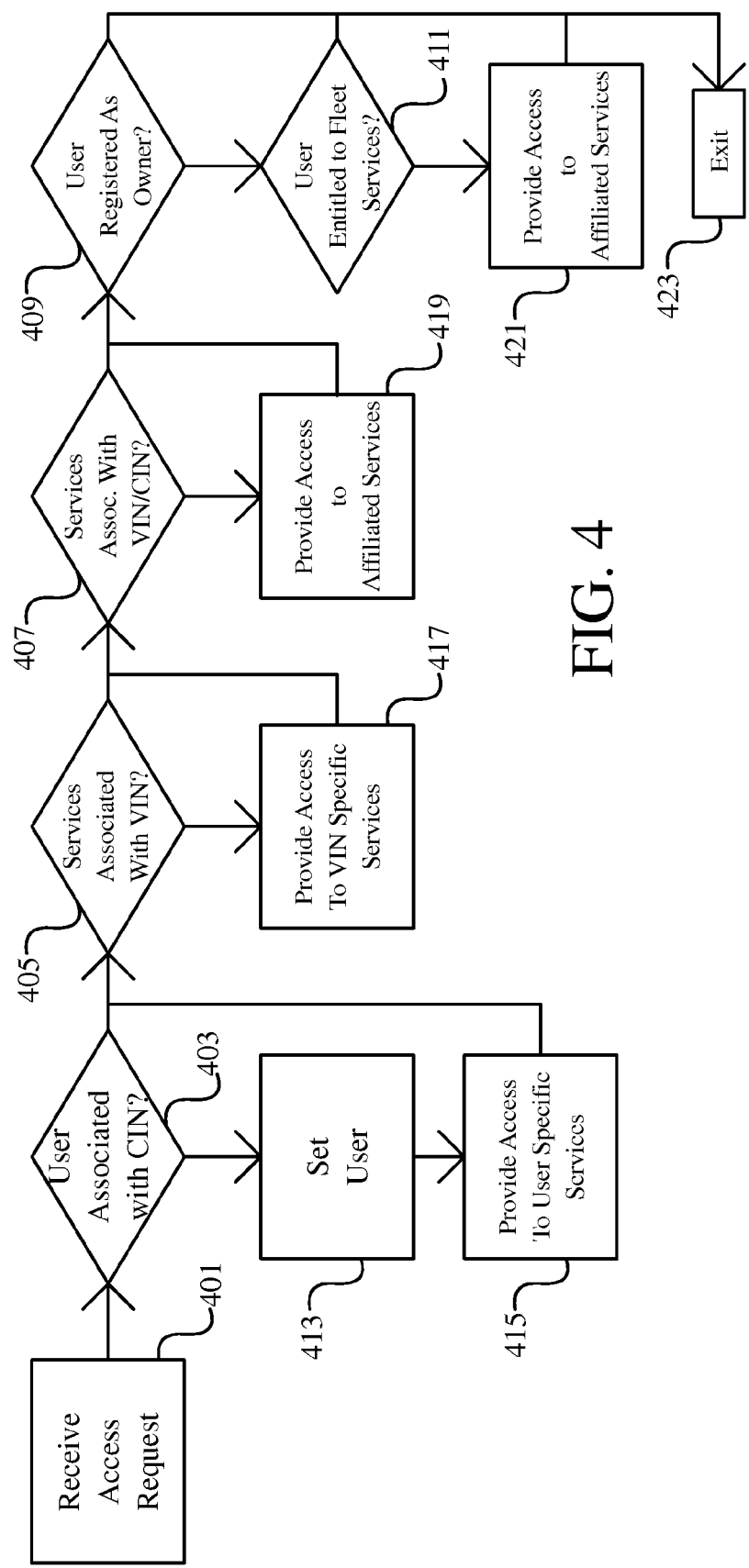
FIG. 4 shows an illustrative example of a process for request handling.

Although there are numerous ways to classify a user, in this illustrative embodiment, shown in FIG. 4, the SDN receives an incoming request for use of the network 401.

Accompanying that request are a CIN and a VIN (or a null-string, indicating that the nomadic device is not presently paired with a vehicle). In this example, the system first checks the CIN to see if any user is associated with the CIN 403.

For example, a user could have an account under which the CIN was a primary number or account identifier, or the CIN could be associated with one or more vehicles as a primary or secondary number. It's also conceived that, in an environment where devices may be addressed, as opposed to possessing a CIN, then the address of the device, or some other identifier, may be used in place of the CIN, but in this example a CIN is used as the connection is made from a device having a CIN.

The check can be against a database, a lookup table, etc. If the user is associated with the CIN, then they system "sets" that user 413 and provides access to any services affiliated with that particular user 415 (subscription based services not restricted by vehicle, for example).

If no user is associated with the CIN, then the system checks to see if any services are associated with the VIN 405. For example, if a new user paired a phone with a rental or borrowed vehicle, but that user did not have an account or an association with the remote network, it still may be desirable to provide certain services based on the vehicle itself. This allows access to services in the absence of a user account or affiliation. Any services usable with that vehicle are provided as accessible to the user 417 if the check is affirmative.

Next, the system checks for services associated with both that user in that vehicle 407. That is, the system checks to see if the user is in a vehicle with which that user is associated, and if that user/vehicle combination entitles the user to any services affiliated with that combination. If there are services that a particular user is entitled to use when in a particular vehicle, those services are then provided 419.

Finally, in this illustrative example, this process can include checking to see if the user associated with the CIN is registered with the remote network as an owner of the vehicle 409.

If the user is an owner, then the system can further check to see if the user owns any other vehicles registered in the system as well 411. It may be the case that ownership of a different vehicle entitles the user to port over services as if the user were driving the other vehicle.

For example, purchasing a luxury vehicle may entitle the owner of that vehicle to use service X for a predefined or unlimited amount of time while driving any vehicle that person owns. That is, it's a premium service that is "fleet portable" within the user's personal fleet.

So if the user is driving a second vehicle, and owns the second vehicle, the user is entitled to use the service that came with the first vehicle by virtue of the ownership of both vehicles. The user is thus provided with any fleet-accessible services 421.

When all checks are complete and access levels are determined, the system exits 423. Of course, this is just one example of determining access levels. The determination can be done, for example, on a per-service-request basis and be limited to the particular request (as opposed to pre-clearing the user). Other suitable manners of identification are also possible and contemplated.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed:

1. A computer-enacted method comprising:
    receiving, at a server, a first wireless device identification (WID) based on a call from the wireless device connecting a vehicle computing system (VCS) to a remote network;
    receiving a vehicle identification number (VIN) of a vehicle housing a VCS based on a request sent from the VCS;
    determining a level-of-service associated based on both the VIN and MID, wherein the level of service varies for a given VIN and received with varied MIDs and vice versa;
    providing VCS access to services corresponding to the determined level-of-service;
    determining a user, based at least in part on the first identification;
    determining the vehicle housing the vehicle computing system, based at least in part on the second identification;
    determining that the user has a particular affiliation with the vehicle;
    determining that the user has a similar affiliation with a second vehicle, wherein the second vehicle has a different level-of-service associated therewith than does the vehicle housing the vehicle computing system; and
    providing access to services corresponding to the level-of-service associated with the second vehicle.

2. The method of claim 1, wherein the WID is a wireless phone number associated with the wireless device.

3. The method of claim 1, wherein the affiliation with the vehicle is an owner-type affiliation.

4. The method of claim 1, wherein the affiliation with the vehicle is a non-owner-type affiliation.

5. A computer-enacted method comprising:
    receiving, at a server, a first wireless device identification (WID) based on a call from the wireless device connecting a vehicle computing system (VCS) to a remote network;
    receiving a vehicle identification number (VIN) of a vehicle housing a VCS based on a request sent from the VCS;
    determining a level-of-service associated based on both the VIN and MID, wherein the level of service varies for a given VIN and received with varied MIDs and vice versa;
    providing VCS access to services corresponding to the determined level-of-service;
    determining a first user, based at least in part on the first identification;
    determining the vehicle housing the vehicle computing system, based at least in part on the second identification;
    determining that the first user has a particular affiliation with the vehicle;
    determining that a second user, having a similar affiliation with the vehicle, has a different level-of-service associated therewith than the first user; and
    providing access to services corresponding to the level-of-service associated with the second user.

6. The method of claim 5, wherein the affiliation with the vehicle is an owner-type affiliation.

7. The method of claim 5, wherein the affiliation with the vehicle is a non-owner-type affiliation.

* * * * *